US006207094B1

(12) United States Patent
Farmer, Sr. et al.

(10) Patent No.: US 6,207,094 B1
(45) Date of Patent: Mar. 27, 2001

(54) METHOD OF FORMING CONCRETE MASONRY BLOCKS WITH EXTERNAL PLATES

(75) Inventors: William Ray Farmer, Sr., San Antonio; James W. Pilcher, New Braunfels, both of TX (US)

(73) Assignee: CCC Group, Inc., San Antonio, TX (US)

( * ) Notice: Subject to any disclaimer, the term of this patent is extended or adjusted under 35 U.S.C. 154(b) by 0 days.

(21) Appl. No.: 09/157,854

(22) Filed: Sep. 21, 1998

Related U.S. Application Data

(63) Continuation-in-part of application No. 08/908,841, filed on Aug. 8, 1997, now Pat. No. 5,809,732.

(51) Int. Cl.$^{7}$ .......................... B29C 39/10; B29C 39/24; B29C 39/38

(52) U.S. Cl. .......................... 264/219; 264/71; 264/234; 264/267; 264/274; 264/275; 264/277; 264/279; 264/279.1

(58) Field of Search .......................... 264/71, 259, 261, 264/264, 267, 273, 274, 275, 277, 278, 279, 279.1, 232, 234, 219

(56) References Cited

U.S. PATENT DOCUMENTS

| | | | | |
|---|---|---|---|---|
| 3,913,881 | * | 10/1975 | Gobler et al. | 264/259 |
| 3,952,402 | * | 4/1976 | Mengeringhausen | 264/267 |
| 4,253,817 | * | 3/1981 | Stinton et al. | 264/261 |
| 4,304,080 | * | 12/1981 | Freeman | 52/309.9 |
| 4,355,453 | * | 10/1982 | Pause et al. | 264/261 |
| 4,670,204 | * | 6/1987 | Cruise | 264/42 |
| 5,124,093 | * | 6/1992 | Schimpff | 264/40.1 |
| 5,402,616 | * | 4/1995 | Klein | 52/601 |
| 5,785,904 | * | 7/1998 | Abou-Rached | 264/35 |

* cited by examiner

*Primary Examiner*—Jill L. Heitbrink
*Assistant Examiner*—Michael I. Poe
(74) *Attorney, Agent, or Firm*—Gunn, Lee & Keelin

(57) ABSTRACT

A method for forming a concrete masonry block having external plates. The external plates with anchors are indexed on pallets that are fed into concrete casting machines by proper location of the plates. Concrete mixture is deposited inside of a mold and compressed into the mold with anchors being located in the concrete material and having at least one external plate. Thereafter, the concrete masonry block with the external plate is removed from the mold and cured.

5 Claims, 17 Drawing Sheets

METHOD OF FORMING CONCRETE MASONRY BLOCKS WITH EXTERNAL PLATES

CONTINUATION-IN-PART

This application is a Continuation In Part of Application Ser. No. 08/908,841 filed Aug. 8,1997, now U.S. Pat. No. 5,809,732.

DISCLOSURE OF THE INVENTION

1. Field of the Invention

This invention relates to concrete masonry blocks and more particularly to concrete masonry blocks that have external plates anchored through the blocks. Further, the invention relates to a method of constructing a wall having concrete masonry blocks with external plates at predetermined locations so that heavy objects can be supported from the external plates secured in concrete masonry blocks in the wall. A method for forming concrete masonry blocks with external plates and internal anchors is also shown.

2. Brief Description of the Prior Art

Concrete masonry blocks have been used in the building of buildings throughout most industrialized countries of the world. Concrete masonry blocks come in many different sizes and shapes. A typical rectangular concrete masonry block used in building a wall will have two external faces so that when the concrete masonry block is installed in the wall, the external faces will be on either side of the wall. Internally, within the concrete masonry blocks, a pair of vertical holes extend upward through the concrete masonry blocks. Typically, one end of the concrete masonry block is fluted and the other end of the concrete masonry block is smooth. The width of the concrete masonry block may vary depending on the strength desired in the wall.

In government buildings, especially prisons, concrete masonry blocks are used because they are structurally strong, functional, and are easy to maintain. However, in many governmental buildings, especially prisons, it is important to be able to anchor items to the wall, which items would not touch the floor. In the past, it has been a very labor intensive process to suspend items from the wall. For example, a hole will have to be drilled through concrete masonry blocks forming the wall and anchor plates installed on either side of the wall. The anchor plates would have to be installed in a way that would not be easily removable. The installing of anchor plates in the wall after the wall is built is very time consuming, labor intensive, and expensive.

Just some of the things that are typically attached to the wall that would require anchor plates would be shelf hooks, privacy panels, grab bars, bunk beds, sliding devices, mounting of doors, television stands, or ceiling plates. These are only some of the items that may have to be attached to the wall in a governmental facility such as a prison.

There is a long felt unmet demand for better ways to attach to concrete walls throughout the industrialized countries of the world. It may be a facility such as a public restroom, cafeteria, school, or any other similar facility that needs to be structurally strong, functional, and easy to maintain. Any public facility that has items suspended from the wall rather than sitting on the floor is much easier to clean and maintain.

Fricker, U.S. Pat. No. 5,197,255, shows an anchoring device for attaching flat panels to a wall. The Fricker patent does not appear to be that close to the present invention.

Kline, U.S. Pat. No. 5,402,616, shows the imbedding of a metal weldment into the concrete slab structure. Again, this patent does not appear to be very close to the present invention.

Parkes, U.S. Pat. No. 3,236,545, shows a replacement block that is used for electrical outlets and conduits. Parker does not talk about supporting items from the wall structure.

Woodruff, U.S. Pat. No. 4,414,674, shows an electric furnace thermal insulating module that does not appear to be close to the present invention.

The patents cited hereinabove were the patents found in the patentability search conducted by applicant. None of the prior art found by applicant suggests in any way the anchoring of external plates to the surface of concrete masonry blocks with internal anchors during the forming of the concrete masonry blocks.

Dec-Tech, Inc. from Covington, Louisiana, has been offering for sale a steel block that can be substituted for a concrete masonry block. The steel blocks by Dec-Tech, Inc. are not formed with concrete. Also, because the steel blocks do not have concrete, the Dec-Tech, Inc. steel blocks do not have anchors extending through concrete to hold the plates in position.

SUMMARY OF THE INVENTION

It is an object of the present invention to show concrete masonry blocks having an external plate or plates that are anchored in the concrete at the time the concrete masonry block is formed.

It is another object of the present invention to have a series of different types of concrete masonry blocks having external plates anchored therethrough, the design of the external plate and the concrete masonry blocks depending on the needs of the end user.

It is a further object of the present invention to have a series of concrete masonry blocks with external plates and anchors extending therethrough, such concrete masonry blocks include the following:

a. Full length, double sided plates with end caps.
b. Half length, double sided plates with end caps.
c. Full length, double sided plates.
d. Half length, double sided plates.
e. Full length, single sided plates.
f. Half length, single sided plates.
g. Half blocks with full length, double sided plates and end caps.
h. Half blocks with double sided plates.
i. Upper half, single sided plates.
j. Full length, double sided plates with different anchor designs.
k. Full length, single sided plates with different anchor designs.

It is a further object of the present invention to provide other designs of external plates on concrete masonry blocks having anchors formed within the concrete masonry blocks at the time of casting.

It is yet another object of the present invention to construct a wall having external plates at various locations in the wall to which items can be suspended from the wall.

It still another object of the present invention to determine the type of external plate that is needed and to include the particular type of external plate in the wall at the time of construction of a wall to support items from the wall.

It is yet another object of the present invention to provide a method of forming concrete masonry blocks having external plates and embedded anchors at the time of casting the concrete masonry blocks so that when the concrete masonry blocks are cured, the external plates are securely anchored to the external surface of the concrete masonry blocks.

It is yet another object of the present invention to provide indexing for positioning the external plates and anchors within molds used to form the concrete masonry blocks.

A concrete casting machine using a mold and supporting pallet is normally used to form concrete masonry blocks. In the present invention, the supporting pallet feeds into the concrete casting machine, and while the casting machine is open, external steel plates and anchors are placed at predetermined locations on the supporting pallet. The mold is then either lowered into position on the supporting pallet with the external plates and anchors being received inside of the mold or raised into position replacing the supporting pallet. The latter method is made possible where the external plates and anchors are secured from the sides via electromagnets. Concrete mix is used to fill the mold box. Normally the mold is vibrated to insure the concrete fills up all of the voids in the mold box.

Next, the compression portion of the mold pushes down into the mold box to compress the concrete mix in the desired shape of a block having external plate or plates with internal anchors. The mold is stripped from the concrete masonry block, the concrete masonry block is removed from the concrete casting machine, and the concrete masonry block is moved to the kiln chamber for heating and solidifying the concrete. The anchors are formed inside the concrete masonry block at the time it is made with the external plates being on the external surface or surfaces of the concrete masonry block.

A wide variety of different types of blocks with external plates can be made. The only limitation is the expense and cost to the end user.

When building a wall that needs external plates for attachment of items to the wall, the wall will be built using normal concrete masonry blocks, but at predetermined locations, blocks with external plates will be installed. Thereafter, items to be suspended from the wall can be anchored to the plate by any convenient means such as welding, though other types of anchoring devices could be used.

By use of external plates already anchored in preformed concrete masonry blocks, the large amount of time, labor, and expense involved in installing plates for suspension of items from the wall has been eliminated. While the concrete masonry blocks with external plates, known as M-Bed Block Systems, is a more expensive block, it more than makes up for the cost differential in the reduced labor and costs. As is known by those skilled in the art, the concrete masonry wall should be reinforced by pouring concrete in the center openings and having reinforcing rods in the poured concrete.

BRIEF DESCRIPTION OF THE DRAWINGS

FIGS. 2*a* through 21 are a series of perspective views of different types of concrete masonry blocks made according to the present invention with the internal anchors being shown in broken lines.

FIG. 5 is a perspective view of a concrete casting machine used to form concrete masonry blocks made according to the present invention.

FIGS. 7*a* and 7*b* are exploded perspective views of the upper and lower portions of the mold with the supporting pallet and external plates and anchors prior to being inserted into the mold box.

FIG. 8 is a partial perspective view illustrating positioning of external plates and anchors on the supporting pallet prior to being received in a mold box of a concrete masonry casting machine.

DESCRIPTION OF THE PREFERRED EMBODIMENT

First, the applicant will describe some of the many different types of concrete masonry blocks that can be formed with external plates anchored through the concrete masonry blocks. Second, a detailed description of one of the many blocks will be given as further reference. Third, illustrative sections of walls will be shown to demonstrate how M/Bed Blocks made according to the present invention would be used. Fourth, how the M/Bed Blocks that have external plates and internal anchors are formed will be illustrated and discussed in a series of views.

Figure 2A:
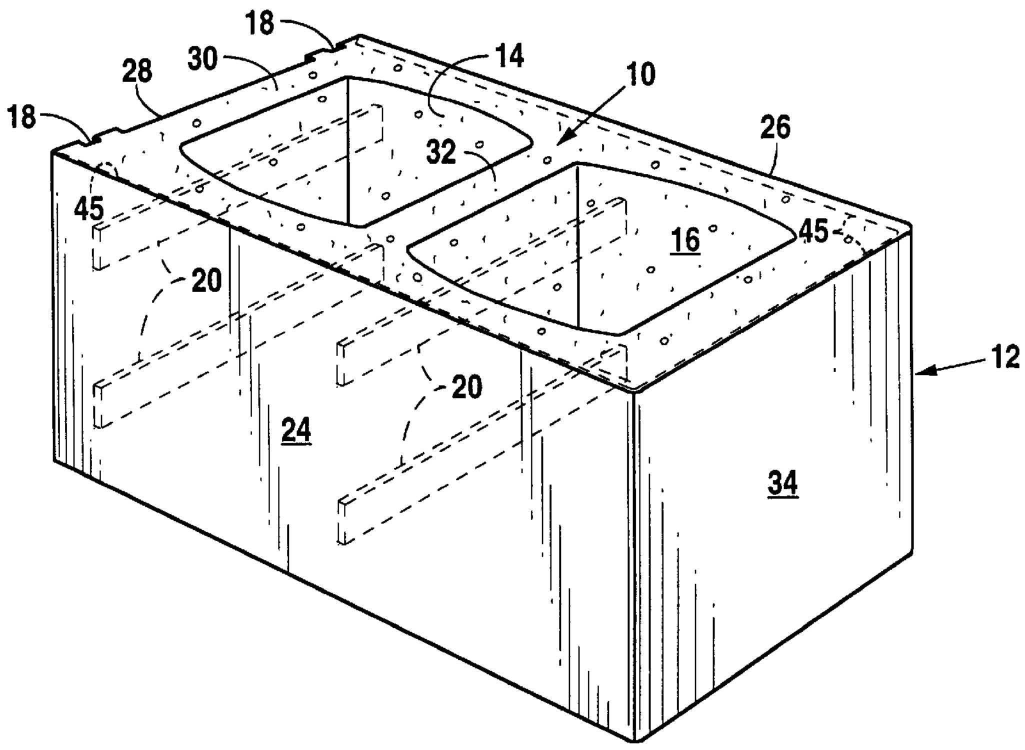

In FIG. 2*a,* a full length block 10 is shown with double sided external plates and end cap 12. The full length block 10 has vertical holes 14 and 16 therein as is standard in most blocks. One end of the full length block 10 has flutes 18 on either side thereof.

Imbedded in the concrete of the full length block 10 are four identical 20. The anchors 20 depicted here are of the type shown in FIG. 1*a*. The anchors 20 are welded to the left side 24 and right side 26 of the double sided external plates and end cap 12. The anchors 20 are shown as perpendicularly extending between the external plates but the could alternatively be at an obtuse angle with respect to said plates 12 (see FIGS. 2*g* and 2*h*). The anchors 20 located at the fluted end 28 are imbedded in the fluted concrete 30. The anchors 20 located at the center of the full length block 10 are imbedded in the center concrete 32.

Figure 1A:
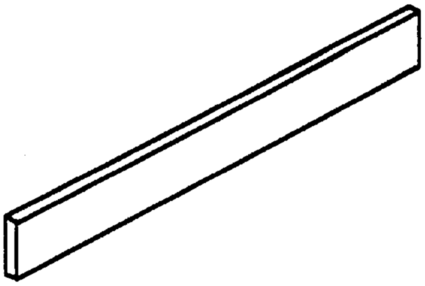
FIGS. 1*a* through 1*c* are depictions of some possible variations in anchor styles.
Figure 1B:
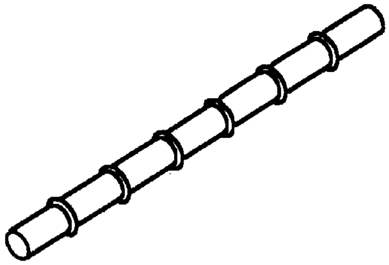
Figure 1C:
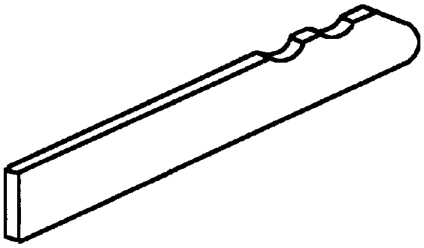
Figure 3C:
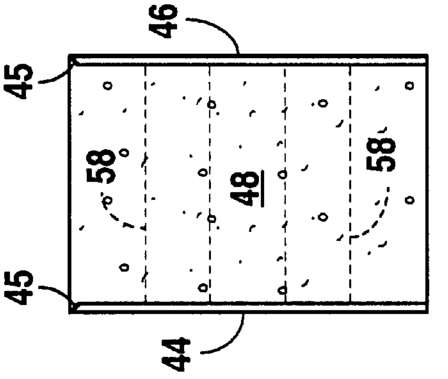
FIGS. 3*a* through 3*c* are the top plane view, front elevational view, and end view of the concrete masonry block illustrated in FIG. 2*c*.

The end cap 34 is formed integrally with the left side 24 and right side 26 of the double sided external plates and end cap 12. While the double sided external plate and end cap 12 may vary in thickness and material, it is presently envisioned that 3⁄16 inch thick steel plates will be used. The top edge of these steel plates may have a chamfer 45 (see FIG. 3*c*) which is an inclination of about 45° sloping downward to the interior space of the full length block. Such an inclination at this edge may accommodate receipt of concrete during the molding process and contribute to an eventual flushness of the steel plates with the external concrete portions of the M/Bed block. The types of anchors and the thickness thereof can vary. However, it is currently envisioned that the anchors 20 will be either 3⁄16 inch steel plates in the configuration as shown in FIG. 1*a,* ribbed re-bar as shown in FIG. 1*b,* or 3⁄16 inch steel plates cut to the configuration as shown in FIG. 1*c*.

In referring to the subsequent FIGS. 2*b* through 21, the same numbers that were used to designate the same parts in connection with FIG. 2*a* will be used for subsequent figures. Only the parts that are different will be described in detail hereinbelow.

Figure 2B:
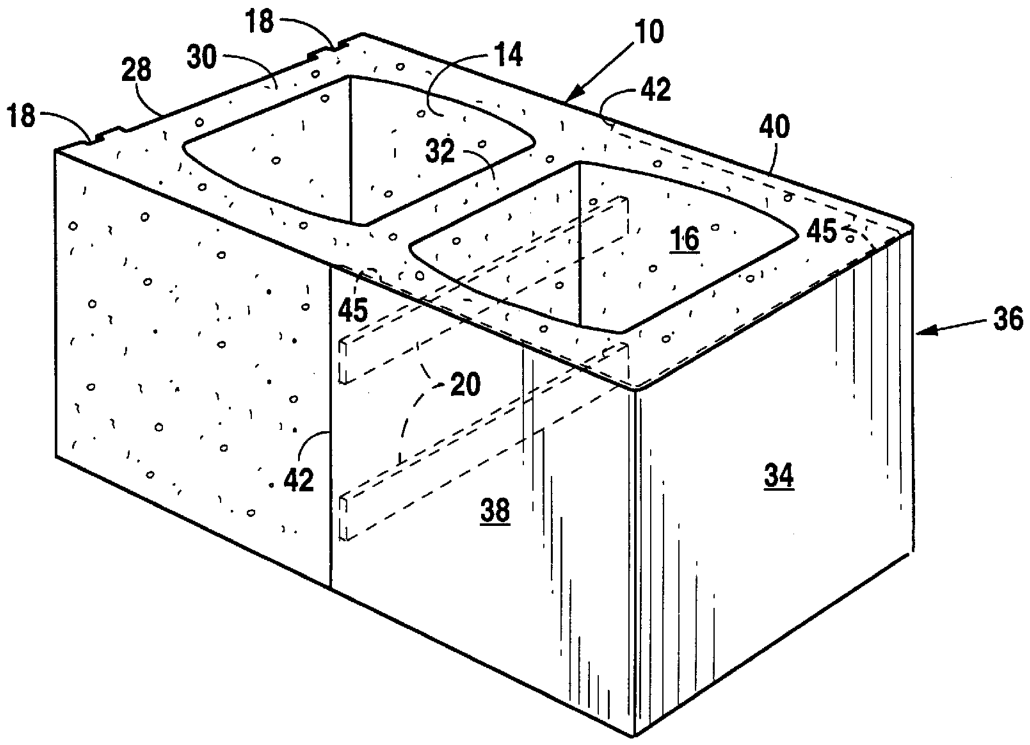

In FIG. 2*b,* a full length block 10 is shown that has half length, double sided plates with end caps 36. Again, the anchors 20 extend through the center concrete 32 and are welded on either end to the left side 38 and right side 40 of the half length, double sided plates 36. The end cap 34 is the same as previously described.

Because the left side 38 and right side 40 of half length, double sided plates 36 are placed in the concrete masonry at the same time the full length block 10 is formed, the external surfaces of the block are basically smooth even at the terminal end 42 of the left side 48 and right side 40 of half length, double sided plates 36.

Figure 2C:
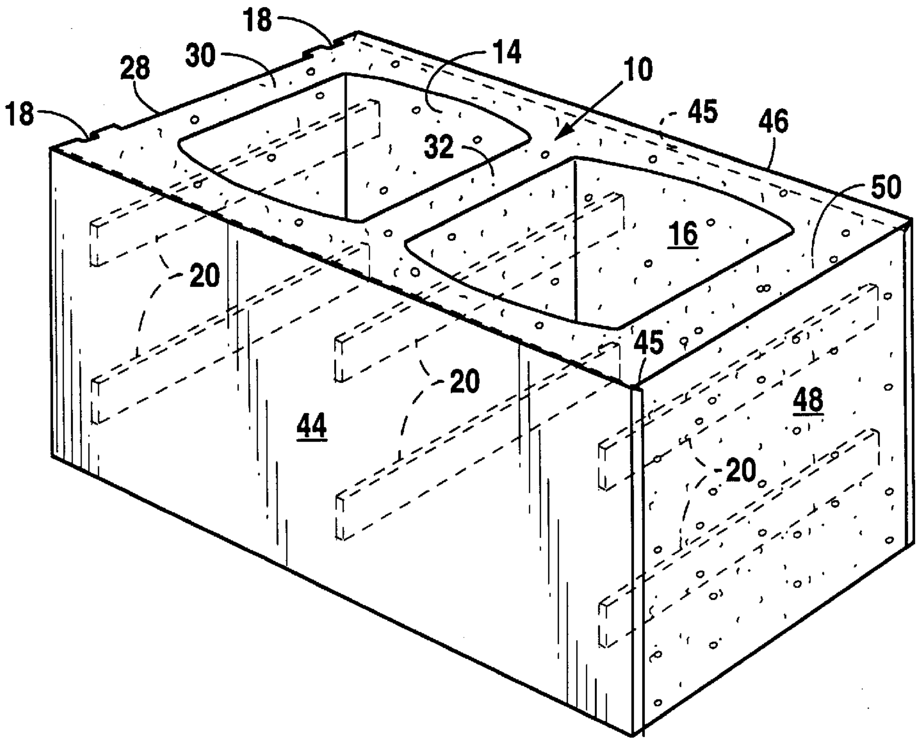

In FIG. 2*c,* a full length block 10 is shown with double sided external plates with a left plate 44 and a right plate 46. The left plate 44 and the right plate 46 are connected together by anchors 20 welded to the respective left plate 44 or right plate 46. The anchor 20 on the fluted end 28 extends through fluted concrete 30. Anchors 20 that are in the middle extend through the center concrete 32. Anchors 20 that are on the flat end 48 of full length block 10 extend through flat end concrete 50.

Figure 2D:
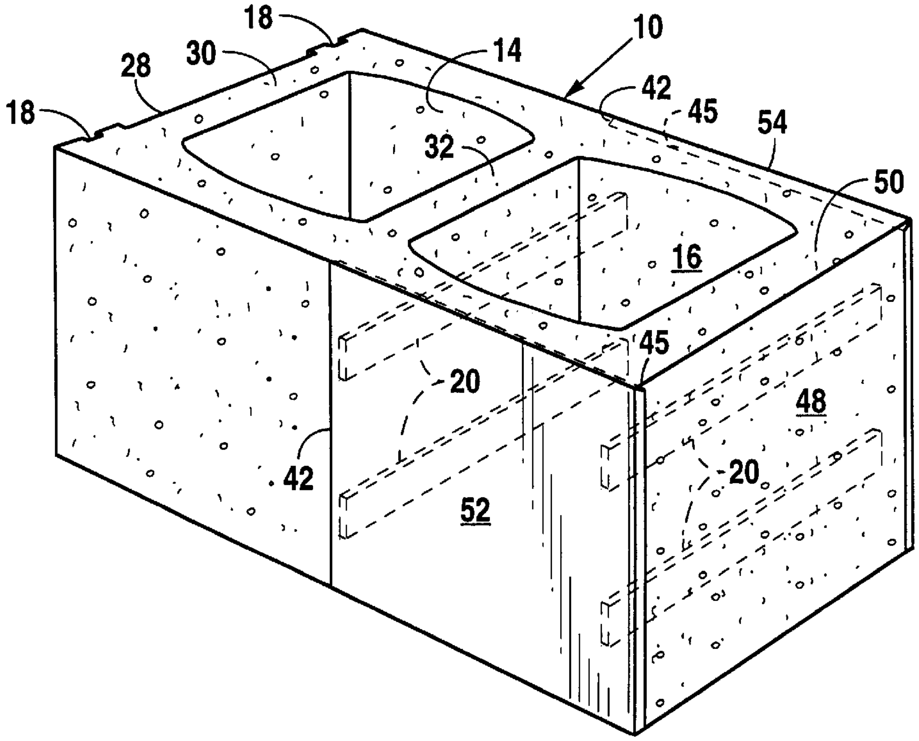

In FIG. 2*d,* a full length block 10 is shown with double sided half plates having a left half plate 52 and a right half plate 54. Anchors 20 that are located at the center of the full length block 10 extend through the center concrete 32. Anchors 20 that are at the flat end 48 extend through the flat end concrete 50. Again, the anchors 20 are connected to the left half plate 52 and the right half plate 54 by welding the ends thereto.

Figure 2E:
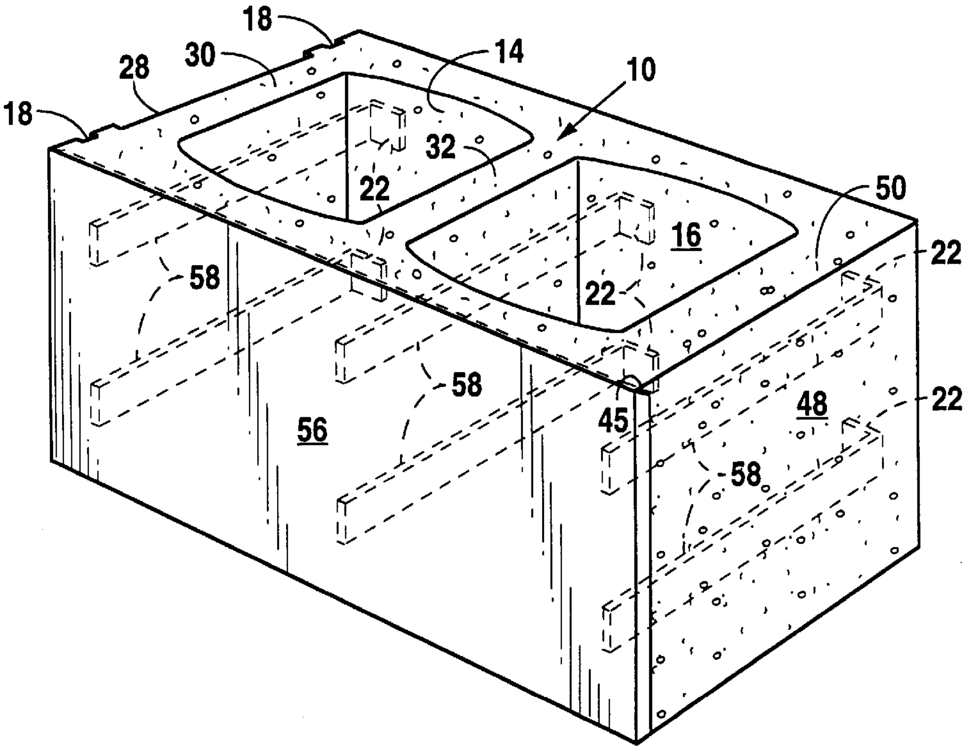

FIG. 2*e* shows a full length block 10 with a full length, single sided plate 56. The anchors 58 are made from an appropriate size steel to withstand the stress. It is believed that 3/16 inch steel cut and bent to the configuration as shown will withstand the stress. However, anchors of other styles may be used. The anchors 58 only have end lips 22 on the right side of the full length, concrete masonry block 10. The anchors 58 are abutted against and welded to the full length, single sided plate 56. The anchors 58 at the fluted end 28 extend through fluted concrete 30 with the end lips 22 being imbedded in concrete on the right side of the full length block 10. Likewise, anchors 58 at the center of full length concrete masonry block 10 extend through center concrete 30 with the end lips 22 being imbedded in concrete on the right side of full length block 10. The anchors 58 located on the flat end 48 of the full length block 10 extend through the flat end concrete 50 with the end lips 22 being anchored in concrete on the right side of full length block 10.

Figure 2F:
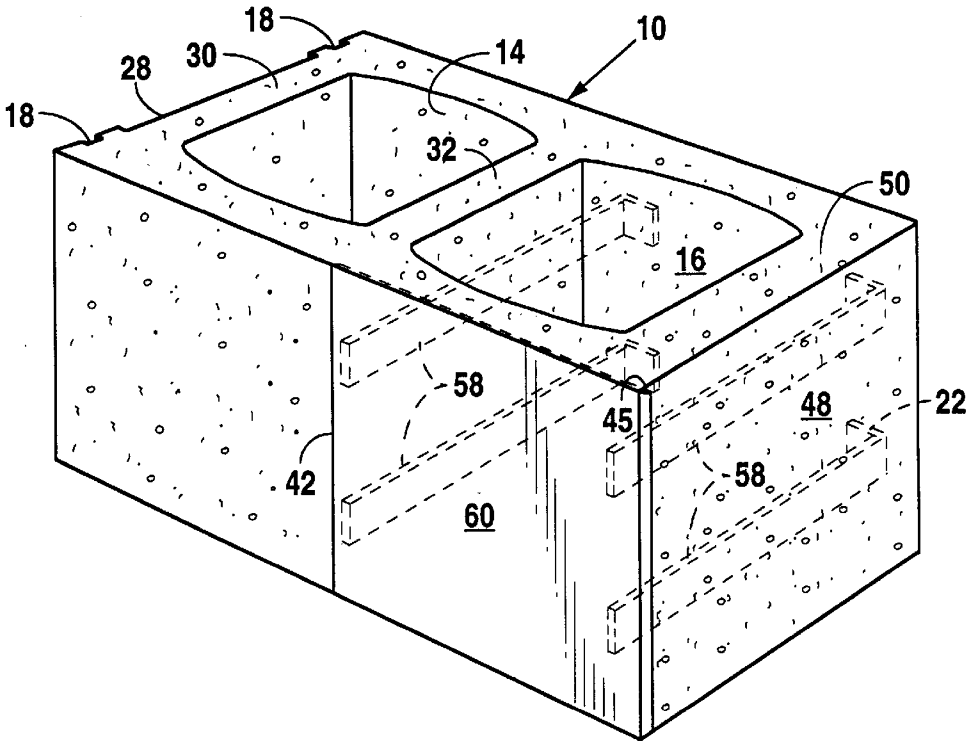

In FIG. 2*f,* a full length block 10 is shown with a single sided, half length plate 60. Anchors 58 are welded to the single sided plate 60 with the center anchors extending though center concrete 32 and the flat end anchors 58 extending through flat end concrete 50. Again, the end lips 22 are imbedded in the concrete on the right hand side of the full length concrete masonry block 10. Additionally, the single sided, half length plate with anchors may be in the form of an end cap positioned at the end of a block (not shown).

Figure 2G:
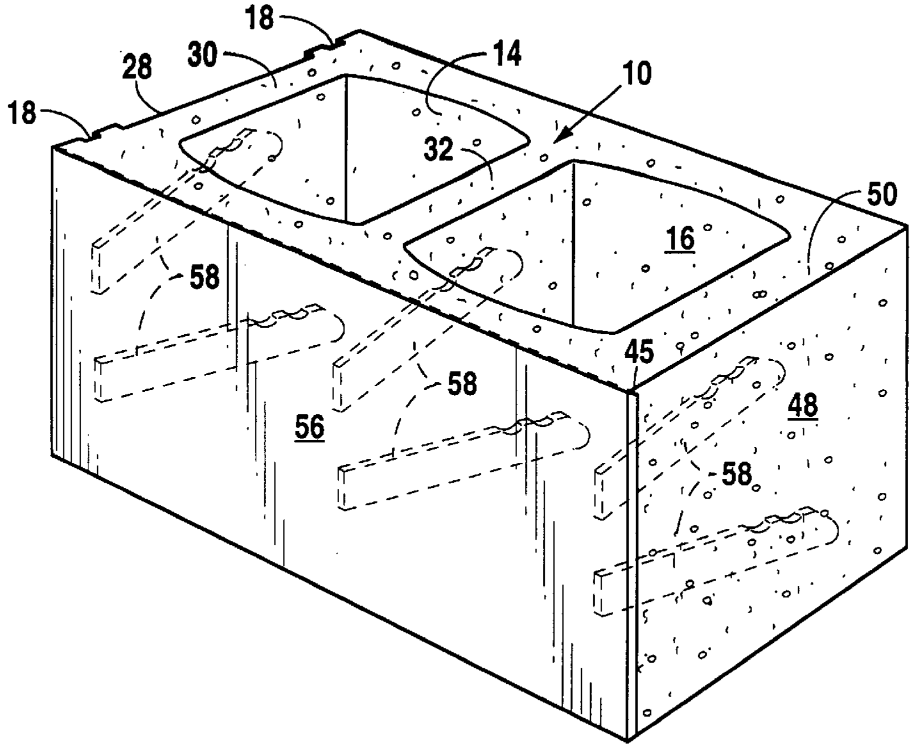
Figure 2H:
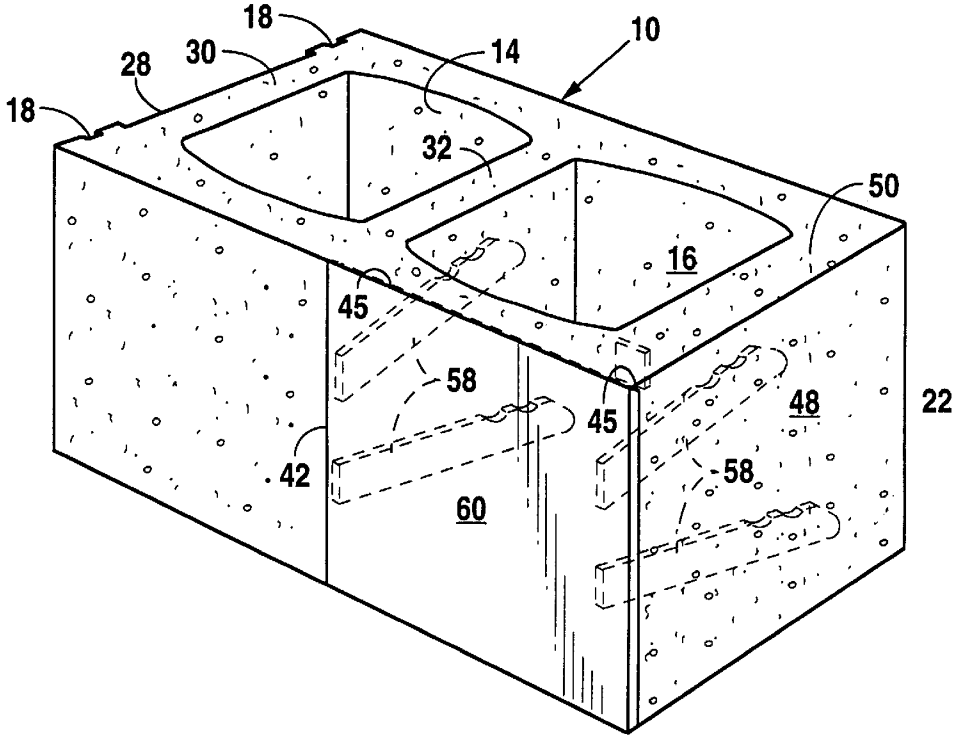

Alternatively, as shown in FIG. 2*g* and FIG. 2*h,* use of anchors 20 of the type depicted in FIG. 1*c* could provide sufficient support when attached to plate 56 or plate 60 near its center and angled toward the opposing corners of the full length block 10. This particular embodiment adds to the overall soundness and strength of structure of the completed concrete masonry block in two ways. First, obtuse anchors 20 aid in securing the plate 56 (or alternatively plate 60) attached thereto within the structure of the completed block. Second, utilizing an anchor 20 of a type having a nonuniform surface (as depicted in 1*b* or 1*c*) aids in securing the anchor itself within the completed block.

Figure 2I:
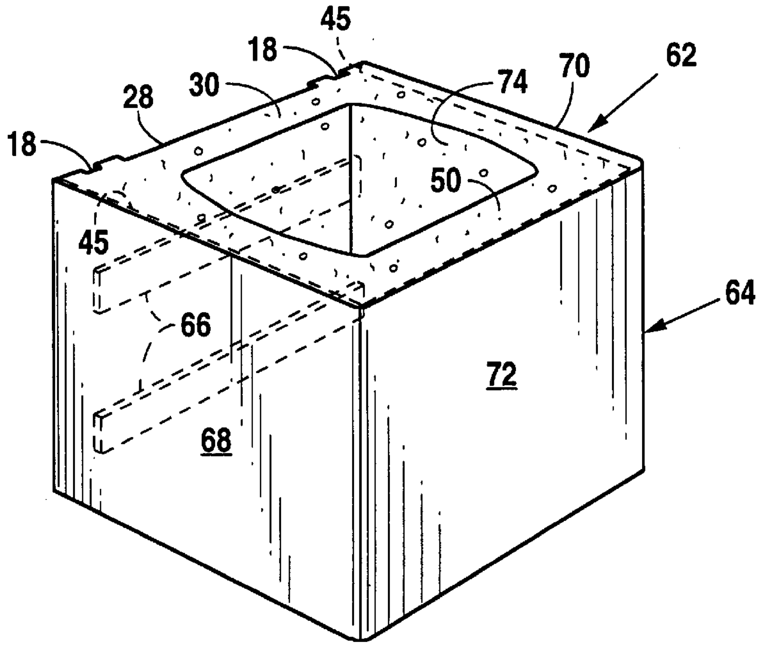

FIG. 2*i* shows a half length block 62 that has double sided, external plates with end cap 64. Anchors 66 extend through the fluted concrete 30 at the fluted end 28 and are welded on either end thereof to the left side 68 and the right side 70 of the double sided, external plates with end caps 64. The double sided external plates 64 have an end cap 72 similar to the end cap shown in FIG. 2*a.*

Figure 2J:
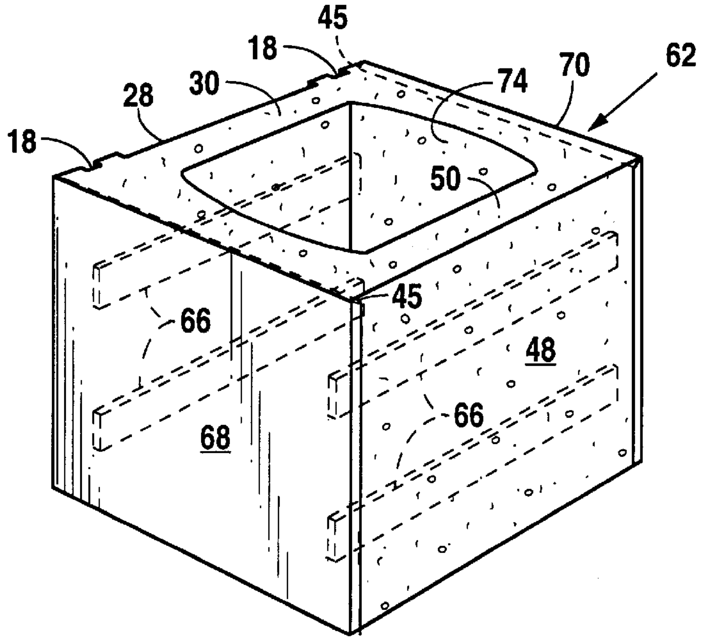
Figure 2K:
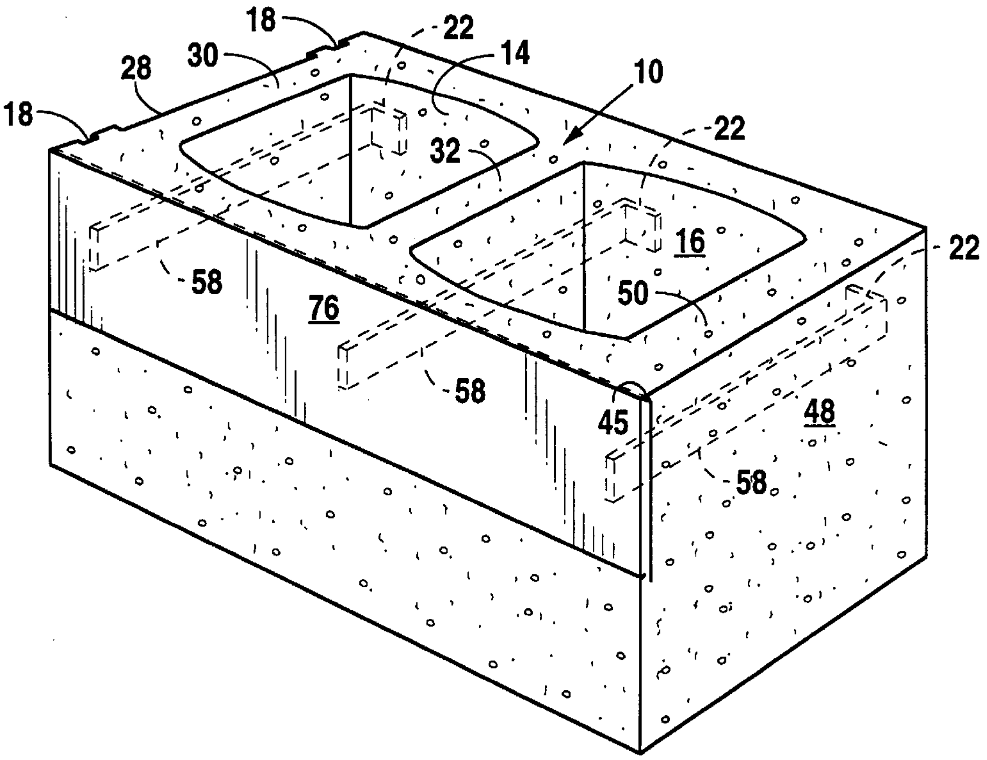
Figure 2L:
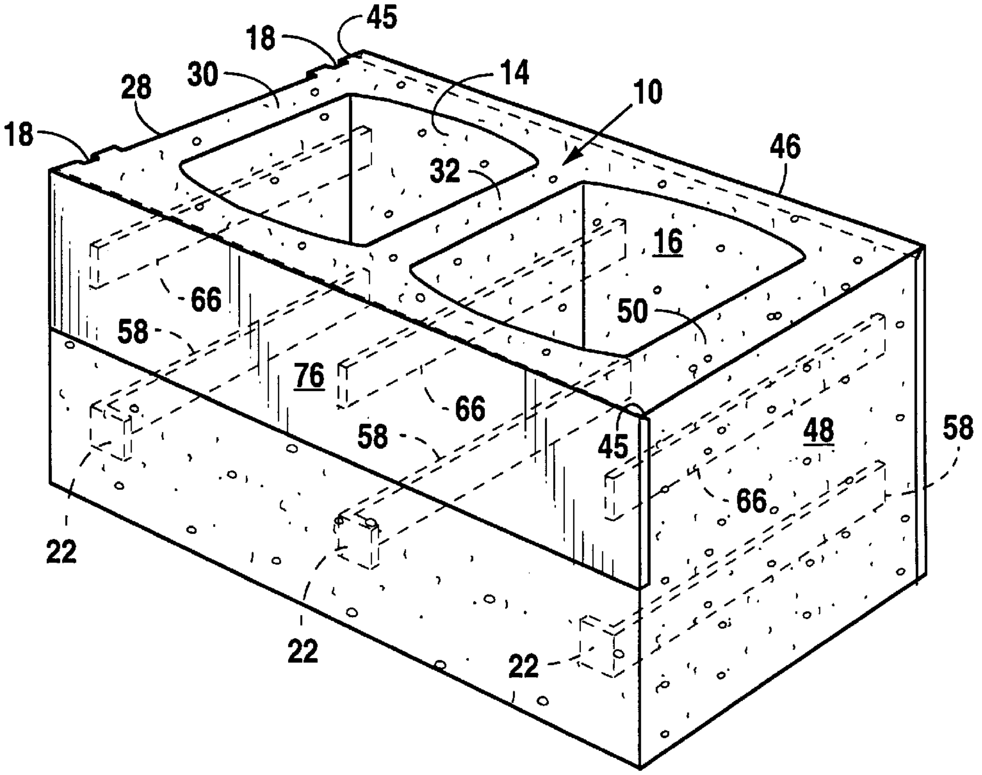

FIG. 2*k* shows a half length block 62 having double sided, external plates made up of left side 68 and right side 70. Again, anchors 66 are welded on either end thereof to either the left side 68 or the right side 70 of the external plates. On the fluted end 28, the anchor 66 extended through the fluted concrete 30. On the flat end 48, the anchors 66 extend through the flat end concrete 50. In both FIGS. 2*i* and 2*j,* a vertical hole 74 extends upward through the half length block 62.

In FIG. 2*j,* a full length block 10 is shown with an upper half, single sided plate 76. Anchors 58 hold the upper half, single sided plate 76 in position. The anchors 58 extend through fluted concrete 30, center concrete 32, and flat end concrete 50. Anchors 20 of the type depicted in FIG. 1*b* are shown, but alternate anchors may be used. The end lips 22, of the anchor type shown, are imbedded in the concrete on the right hand side of full length block 10. The anchors 58 are welded to the upper half, single sided plate 76. The anchors 20 may be angled other than perpendicularly with respect to the upper half, single sided plate 76.

FIG. 21 shows a full length concrete masonry block 10 with single sided plate 46 on one side and an upper half single sided plate 76 on the other side. The lower anchors 58 have end lips 22 to hold in the concrete. Upper anchors 66 used in FIG. 21 consist of a flat piece of metal cut and welded to plate 46 and plate 76. Again, the anchors 66 are imbedded in fluted concrete 30, center concrete 32, and flat end concrete 50. Alternatively, the lower anchors may be of the types depicted in FIGS. 1*b* and 1*c* and may be angled toward the lower corner of block 10 opposite the single sided plate 46.

Figure 3A:
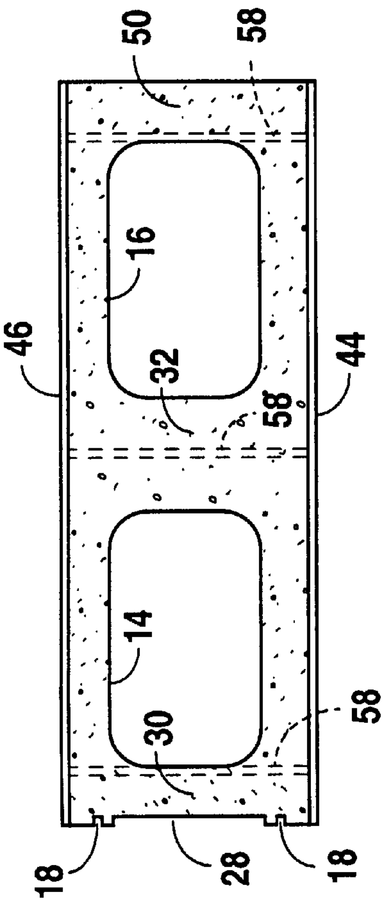
Figure 3B:
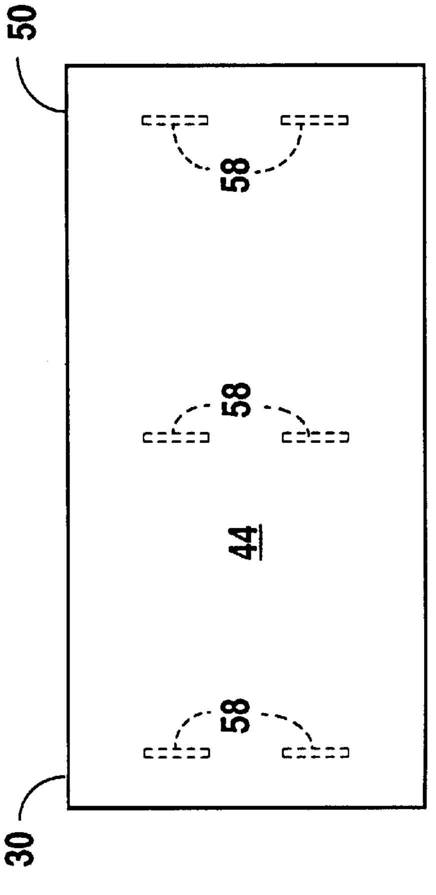

To illustrate in more detail the physical construction of one of the concrete masonry blocks shown in FIGS. 2*a* through 21, FIG. 2*c* has been selected for illustration purposes. Referring to FIGS. 3*a, b,* and *c* in combination, the physical layout of a typical concrete masonry block having external steel plates is illustrated. Again, the same numbers will be used as were used in FIG. 2*c* for illustration purposes. The anchors 58, as they connect from left plate 44 to right plate 46, are clearly illustrated. Also, the burying of the anchors 58 in either the fluted concrete 30, center concrete 32, or flat end concrete 50 is also illustrated. Additionally, a 45° chamfer 45 is shown. By viewing FIGS. 2*a* through *c* in combination, the physical structure of a typical block having external plates and anchors as shown in the present invention is clearly illustrated.

Assume that blocks such as illustrated in FIGS. 2*a* through 21 have been made. The purpose of FIGS. 4*a* through 4*g* is to illustrate how those blocks would be used in a typical wall. Like numbers that are used to illustrate wall sections will be used in all of the FIGS. 4*a* through 4*g*. Only a short section of the wall will be illustrated to demonstrate the different types of uses of blocks having external plates as shown in the present invention.

Figure 4A:
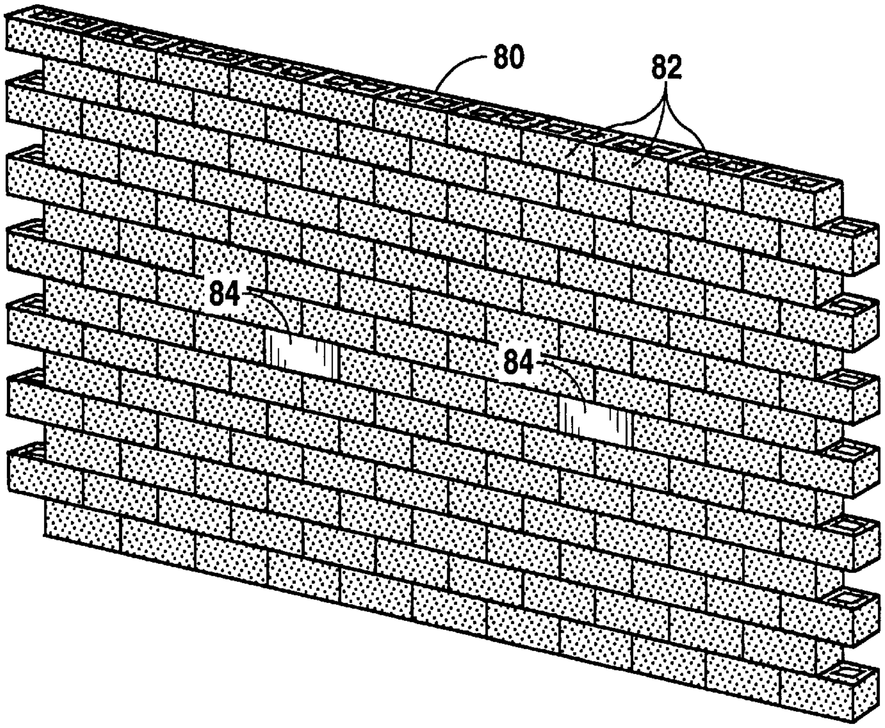
FIGS. 4*a* through 4*g* are planned perspective views of sections of walls utilizing different concrete masonry blocks made according to the present invention.

Referring to FIG. 4*a,* a block wall section 80 is illustrated. The plain blocks 82 do not have any external plates formed therein. However, two blocks are made according to the present invention and have external plates 84. The external plates 84 are at a height that is typically used to mount shelves. Shelf hooks would be welded or anchored to external plates 84 by any convenient means. In the typical block wall section 80, the wall would need to be poured and reinforced with reinforcing rods to maintain the structural integrity of the wall. This is especially true when an object of heavy weight is to be supported from the external plates 84.

Figure 4B:
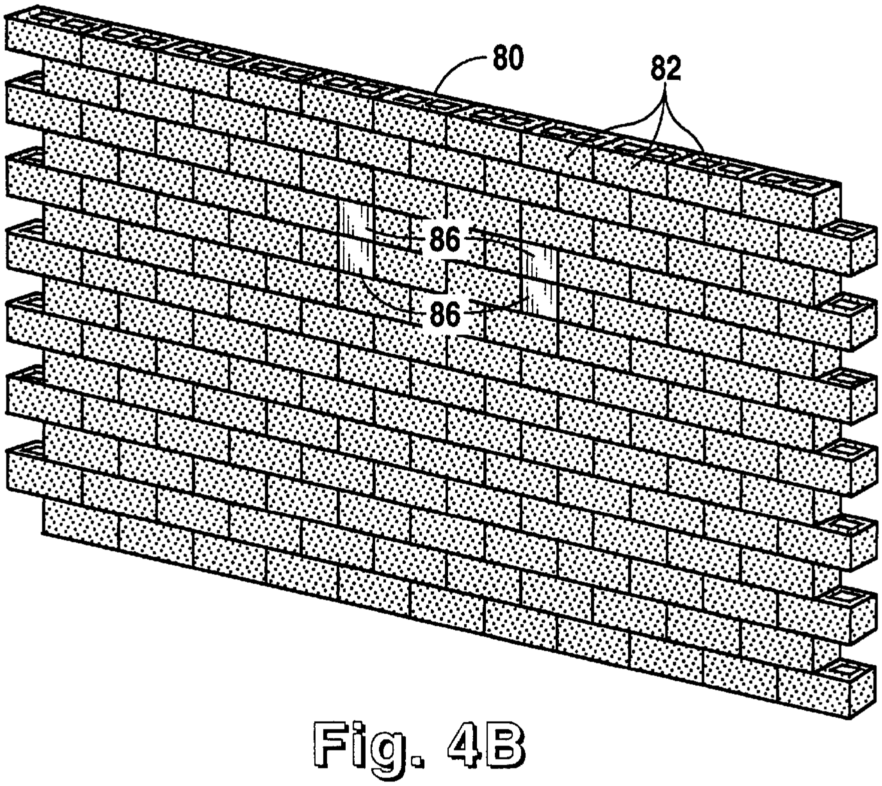

Block wall section 80 as shown in FIG. 4*b* has a total of four half plates 86. The half plates 86 are arranged in such a configuration that two of the half plates are located one above the other with the other two half plates being on the same plane, but a few feet apart. The half plates 86 as illustrated in FIG. 4*b* are of a typical height on which a television stand could be mounted. By simply attaching mounting brackets to the half plates 86, a television stand could then be supported by the block wall section 80. Again, all the remainder of the blocks will be plain concrete masonry blocks 82.

Figure 4C:
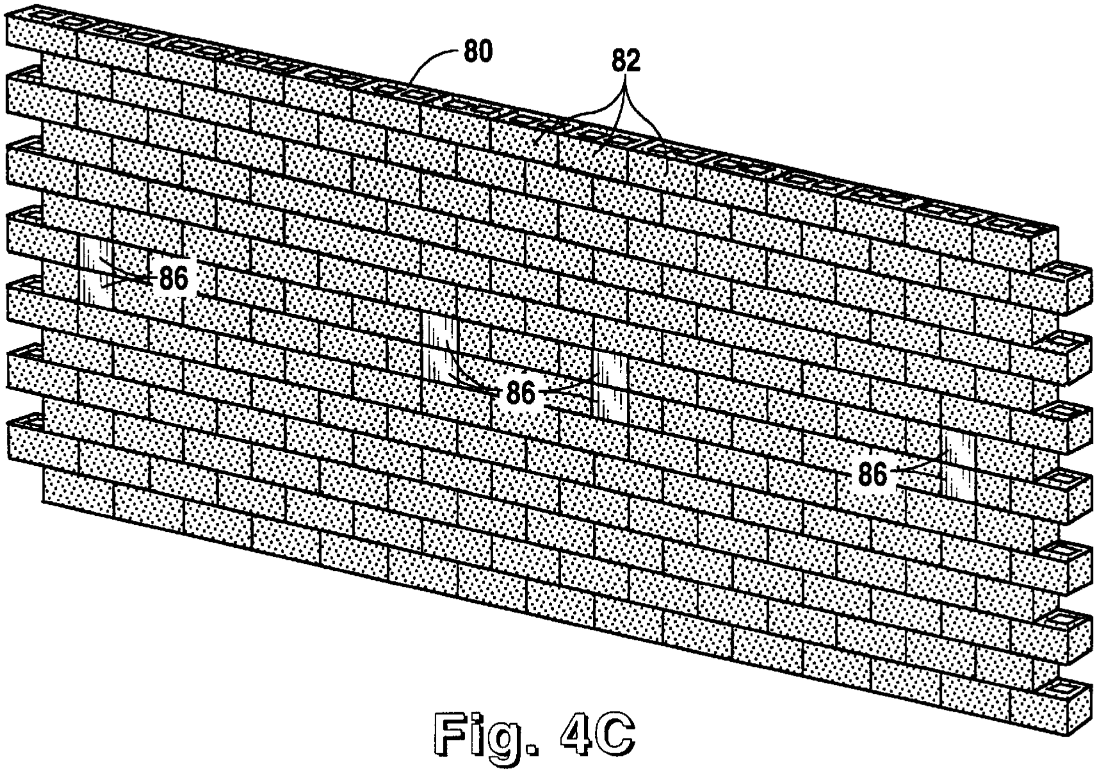

Referring to FIG. 4*c,* half plates 86 are mounted in the wall and arranged so that they are paired with each pair having two half plates in a vertical arrangement. All of the pairs of half plates 86 are on the same plane. The configuration as shown in FIG. 4*c* is arranged at a typical height so that bunk beds could be attached to the wall 80. By welding or attaching appropriate hooks to the half plates 86, bunk beds could then be suspended from the wall 80. Again, the remainder of the blocks could be plain concrete masonry blocks 82.

Figure 4D:
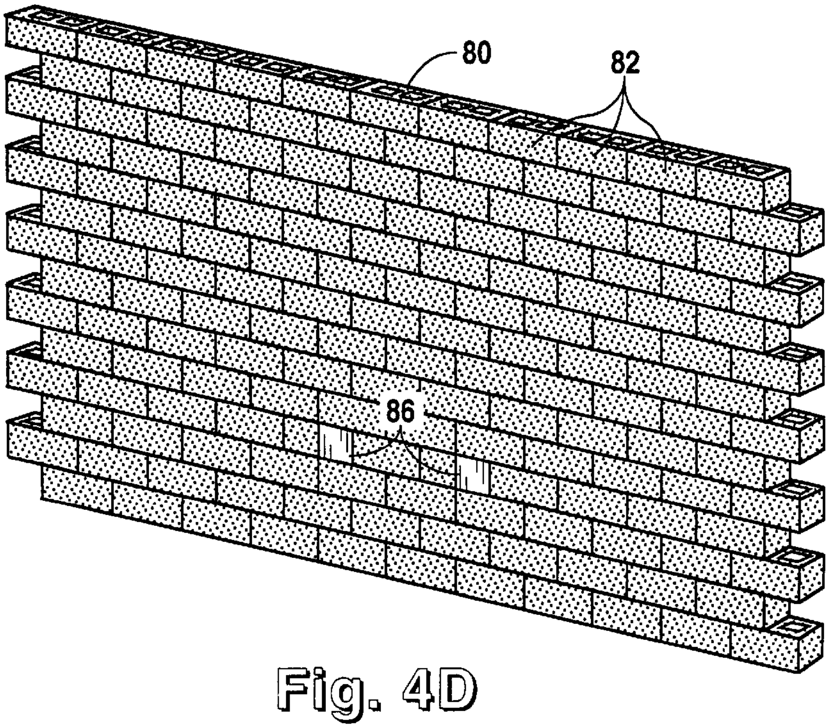

FIG. 4*d* shows a wall section 80 constructed primarily of plain blocks 82, but having two half plates 86 arranged a couple of feet from the bottom of the wall. The half plates 86 are in the same plain and would typically be used to attach grab bars thereto.

Figure 4E:
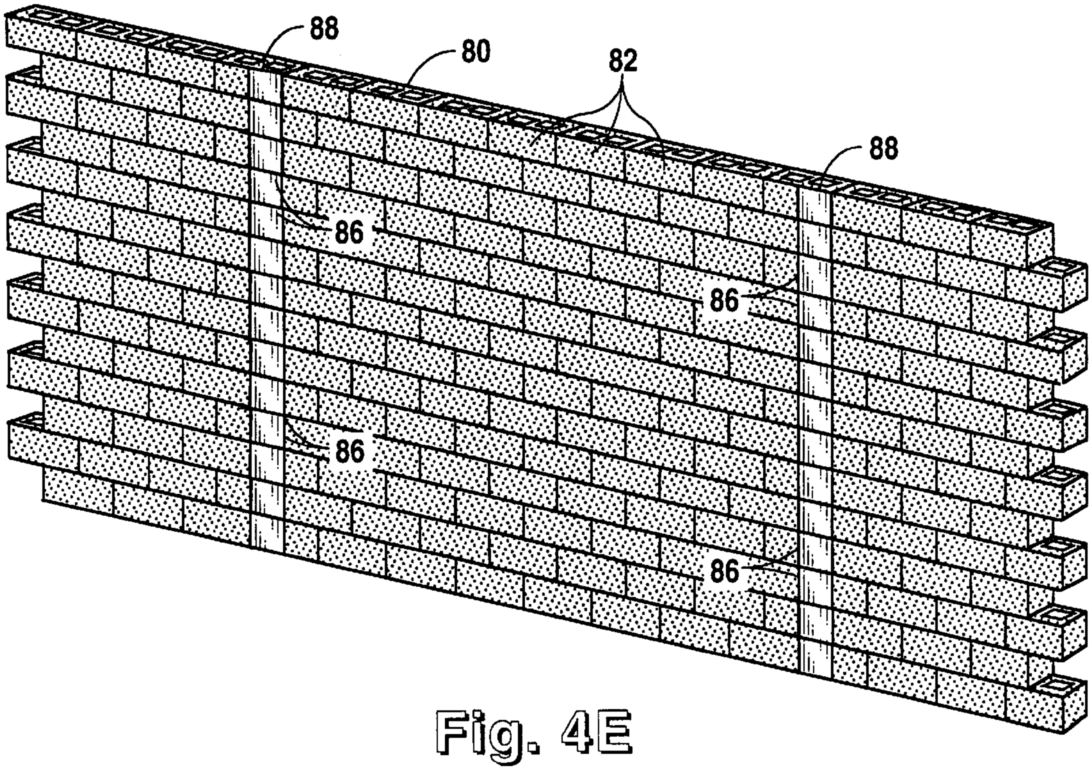

In FIG. 4*e,* a wall section 80 is illustrated constructed primarily of plain concrete masonry blocks 82. However, in FIG. 4*e,* vertical rows 88 of half plates 86 are shown. The vertical rows 88 are used to attach privacy panels or other types of dividers as may typically be used in restrooms.

Figure 4F:
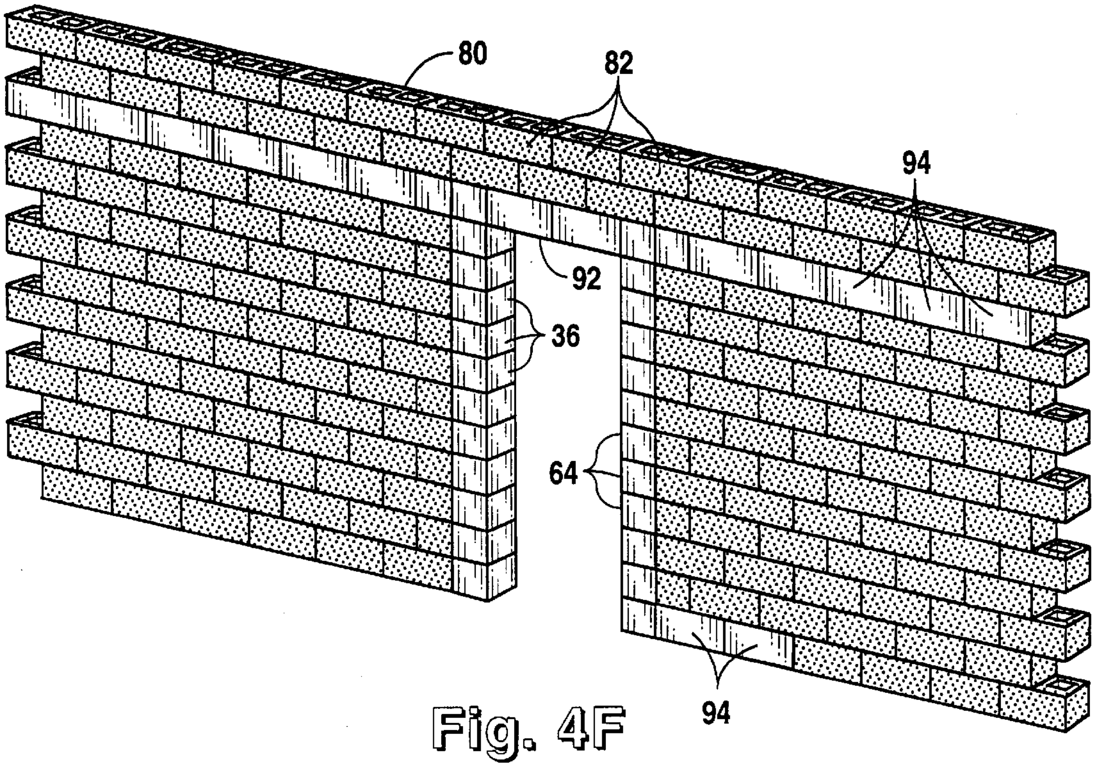

Referring to FIG. 4*f,* the wall section 80 is shown that has a doorway 92 located therein. Surrounding the doorway are a combination of full length blocks having half length, double sided plates with end caps 36 and half length blocks having double sided, external plates with end caps 64. The door structure (not shown) would be attached to the combination of half length, double sided plates with end caps 36 and the double sided, external plates with end caps 64.

If the door is a sliding door, the lower part could have a full length, double sided external plate and end cap 12 with full length, double sided plate 94.

At the top of the doorway 92, full length, double sided plates 94 may be mounted in a row. These full length, double sided plates 94 that are mounted in the horizontal row at the top of the doorway 92 can be used for a number of different purposes. First, if the door is a sliding type door, it can be used to mount the door (not shown). Second, if some type of sliding device needs to be suspended from the wall, full length, double sided plates 94 provide an excellent way to mount the sliding devices. While FIG. 4*f* has been described as full length, double sided plates 94, they could be single sided, full length plates.

Figure 4G:
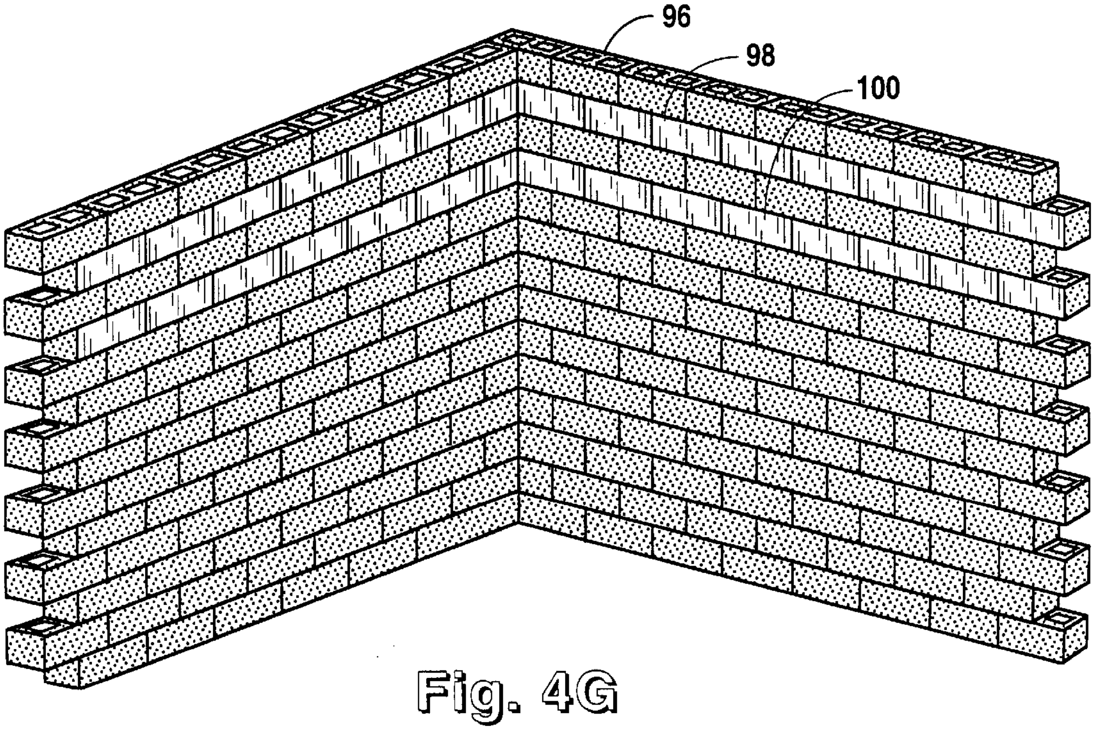

FIG. 4*g* shows a corner section 96 of a typical wall utilizing the present invention. In the corner section 96, there are two horizontal rows 98 and 100 of full length plates made according to the present invention. The horizontal row 100 of the external plates could be used to mount sliding devices thereto. The upper horizontal row 98 would be what is typically used in prisons to mount ceiling plates to prevent escape of the prisoners.

It should be realized that any number or combination of external plates made according to the present invention could be installed in the wall depending on what the end user wants to accomplish with the invention.

Figure 5:
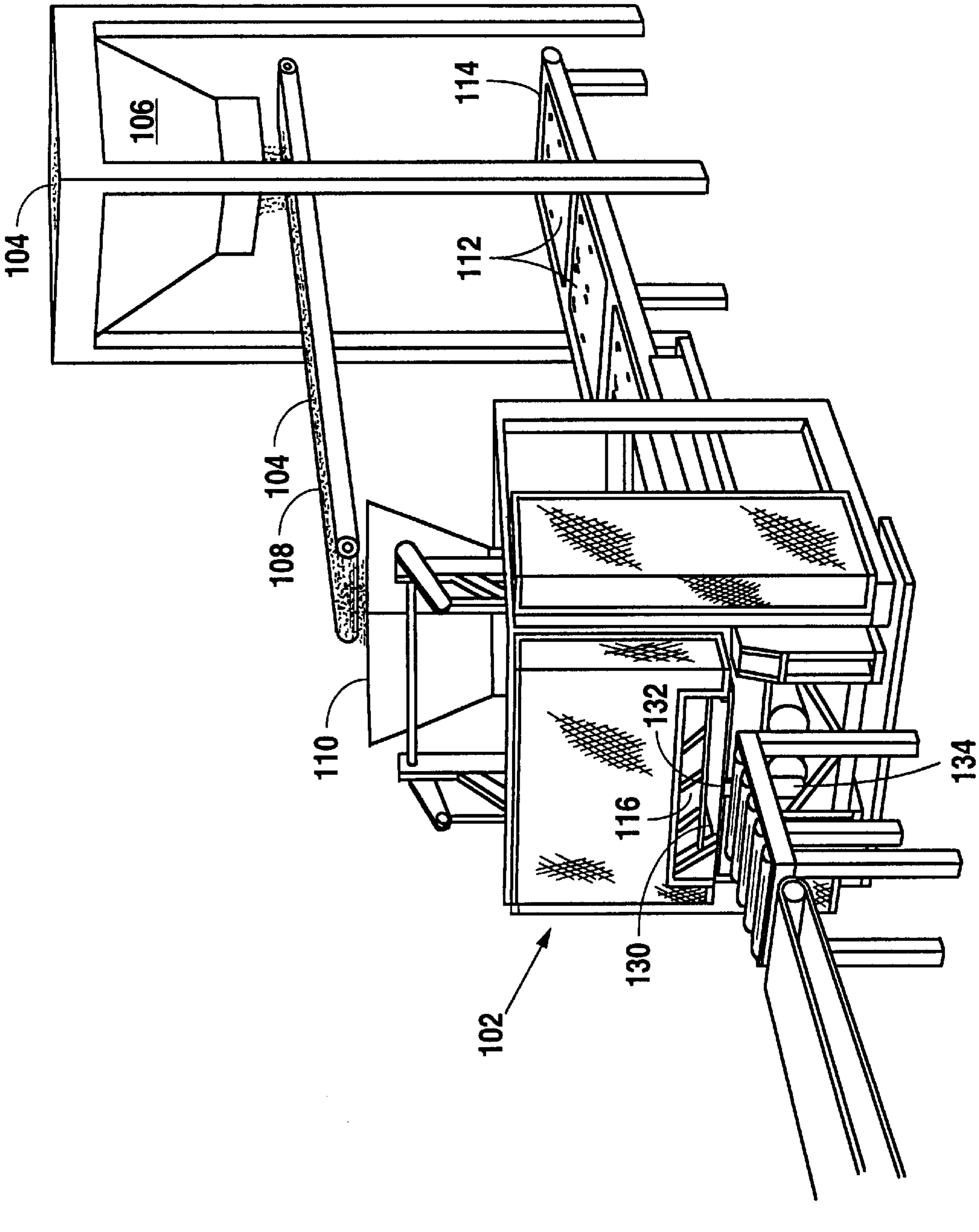

FIG. 5 shows a typical concrete masonry block casting machine illustrated by reference numeral 102. While many different types of casting machines could be used, for the purposes of the present illustration, a Fleming machine is illustrated. However, concrete casting machines made by Columbia or Besser could also be used. Concrete mix 104 is stored in a hopper 106. The concrete mix 104 feeds from the hopper 106, on the belt conveyor 108, to the intake 110 of the concrete casting machine 102.

Pallets 112 also feed into the casting machine 102 by means of conveyor 114. Mold 116 is positioned in the concrete casting machine 102 in the conventional way. Mold 116 determines the type of concrete masonry block being case. The operation of the concrete casting machine 102 is typical with the exception of the portions described hereinbelow.

Figure 6A:
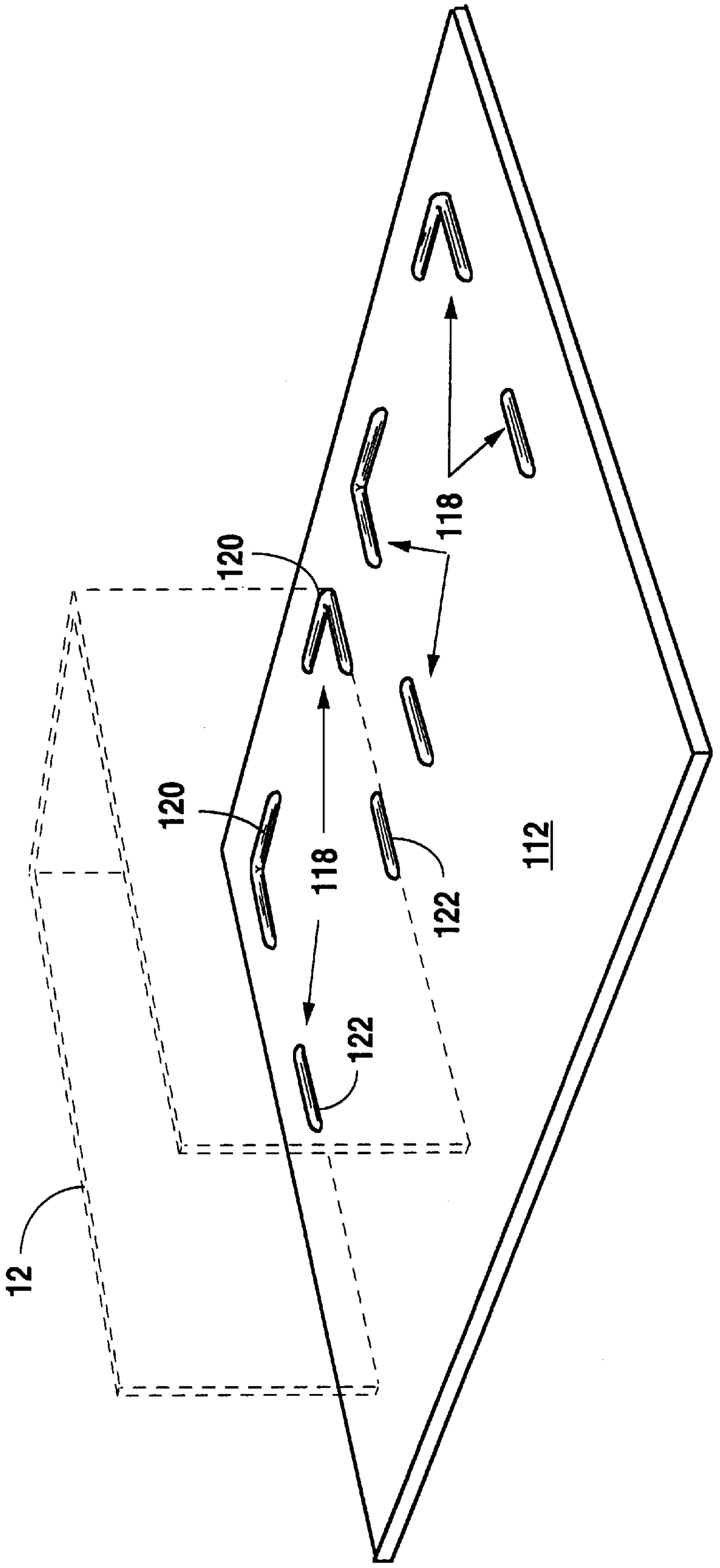
FIGS. 6*a* and 6*b* are perspective views of a supporting pallet containing indexing to properly locate the external plates and anchors on the supporting pallet prior to insertion into a mold of a concrete masonry blocks casting machine.
Figure 6B:
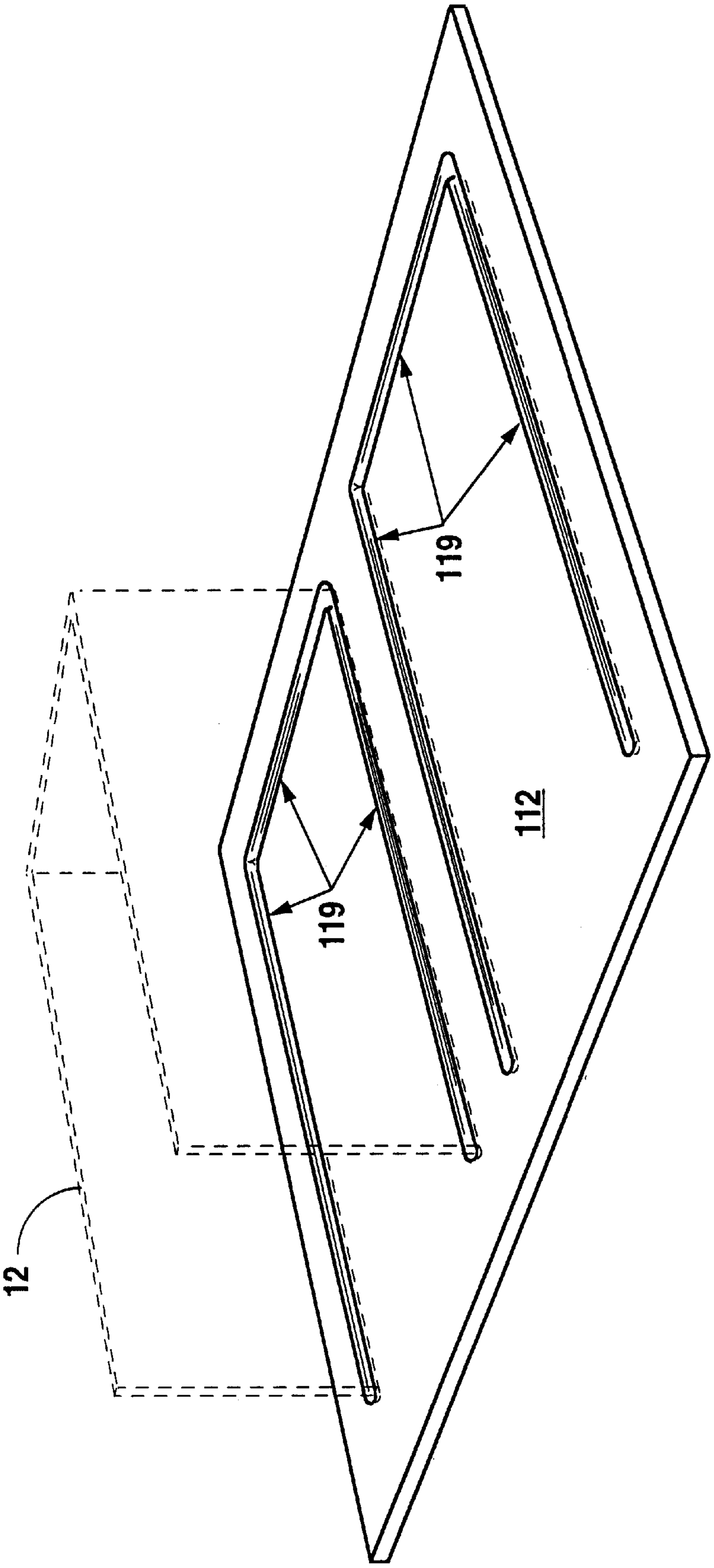

Referring to FIGS. 6*a* and 6*b,* perspective views of a typical pallet 112 that would be used to form concrete masonry blocks according to the present invention are shown. The pallet 112 may have a combination of rounded humps 118, as in FIG. 6*a,* that would typically extend about one eighth of an inch high. Alternatively, the pallet 112 may have a combination of depressed grooves 119 carved therein, as in FIG. 6*b,* that could be of a one eighth inch depth. The rounded humps 118, or the depressed grooves 119, can then be used to position the external plates on the pallet 112. For example, a double sided external plate with end cap 12 is illustrated on pallet 112 of FIGS. 6*a* and 6*b.* The double sided external plate and end cap 12 is pushed securely against the corner humps 120 and the side humps 122 or pushed securely into the depressed grooves 119 as in FIG. 6*b.*

The humps 120 and 122 are inside the steel plates in FIG. 6*a.* If outside, the mold 116 must be indented to accommodate the humps 120 and 122. If inside, the concrete in the formed block will contain an indentation when formed, but the indentation will be filled with mortar when the block is installed in a wall.

Figure 7:
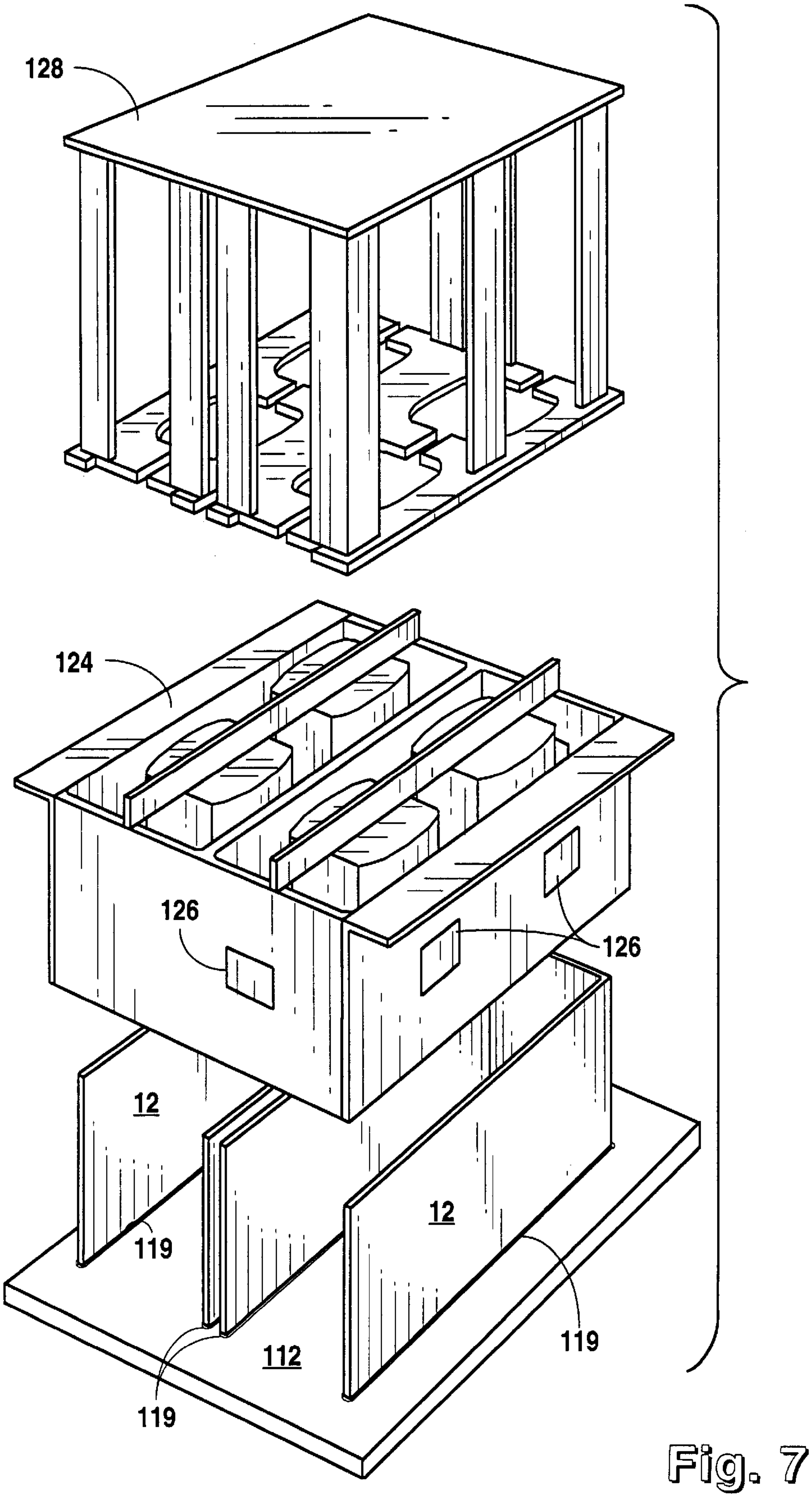

Inside of the concrete masonry casting machine 102, the external plates and/or anchors must be located inside of the mold 116. Referring to FIG. 7, an exploded perspective view of how the external plates and molds fit together is illustrated. As FIG. 7 shows, an external plate (double sided with end cap shown 12) is positioned on the pallet 112 within the depressed grooves 119. Alternatively, the pallet 112 may be of the type securing the double sided, external plate and end cap with corner humps 120 and side humps 122 (not shown in FIG. 7). When the lower part of the mold box 124 moves down, the double sided, external plates and end cap 12 are received inside of the mold box 124. If it is necessary to secure the double sided, external plates and end cap 12 in position, electromagnets 126 may be included in the mold box 124 to aid in securing external plates 12. The electromagnets may also allow for the securing of external plates 12 in the absence of the pallet 112. This mold securing means could be used in securing external plates whether or not the plates were of the double sided with end cap 12 (as shown) configuration.

Once the lower part of the mold box 124 is filled, the upper portion of the mold 128 comes down and presses the concrete mix to form a block in the desired shape as dictated by the mold 116 including the lower part 124 and upper part 128.

Figure 8:
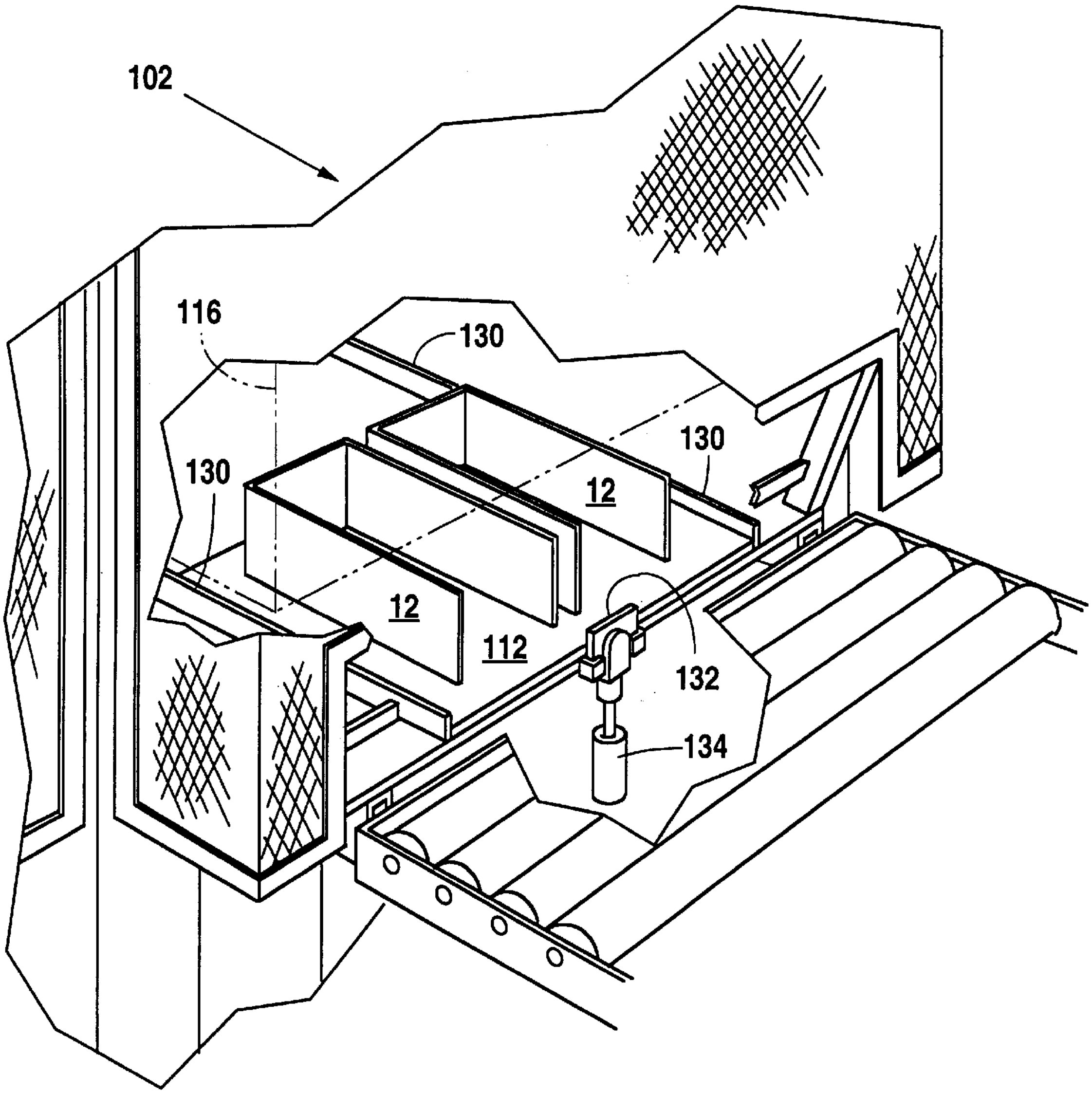

Between the making of concrete masonry blocks by the concrete casting machine 102, the number and shape being determined by the mold 116, the operator must position the external plates into position on the pallet 112. In the Fleming machine, it is open for a period of time during which the steel plates may be inserted and positioned on the pallet 112. This is illustrated in FIG. 8. The pallet also must rest in a very accurate position against side rails 130 and against a stop 132 so that everything is properly aligned with the mold 116. The stop 132 may be lowered by motor 134 when the cast masonry blocks are to be removed.

What is claimed is:

1. A method of forming a concrete masonry block in a casting machine used to form concrete masonry blocks on supporting pallets including the steps of:

positioning said supporting pallets inside said casting machine;

receiving said supporting pallets inside a mold mounted in said casting machine;

depositing mixed concrete inside said mold;

compressing said mixed concrete inside said mold to form said concrete masonry block;

removing said formed concrete masonry block from said mold; and curing said formed concrete masonry block, the improvement consisting of the following steps:

indexing said supporting pallets that are to be fed into said casting machine;

positioning at least one external plate with anchors on each of said supporting pallets, said supporting pallets having humps extending from a surface of each of said supporting pallets or depressed grooves extending into a surface of each of said supporting pallets, said positioning at least one external plate with anchors including securely abutting said at least one external plate against said humps in each of said supporting pallets or securely pushing said at least one external plate into said depressed grooves in each of said supporting pallets;

receiving said at least one external plate and with anchors positioned on each of said supporting pallets inside a mold mounted in said casting machine;

depositing mixed concrete inside said mold and around said anchors of said at least one external plate;

compressing said mixed concrete inside said mold and around said anchors to form said concrete masonry block having said at least one external plate with said anchors on an external surface of said formed concrete masonry block and having said anchors embedded into said formed concrete masonry block.

2. The method of forming a concrete masonry block as in claim 1, further comprising securing said external plates with anchors in absence of said supporting pallets through a mold securing means after said receiving step prior to said removing step.

3. The method of forming said concrete masonry block in said casting machine as recited in claim 1 wherein said positioning said supporting pallets step includes providing a guide and stop to position said supporting pallets.

4. The method of forming said concrete masonry block in said casting machine as recited in claim 1 wherein said indexing step a preliminary step of notching said mold used to form said concrete masonry block to accommodate said humps before locating said mold in said casting machine.

5. The method of forming said concrete masonry block in said casting machine as recited in claim 1 wherein said concrete masonry block and said external plates are varied in size or shape.

* * * * *